United States Patent
Englund (10) Patent No.: US 7,121,771 B2
(45) Date of Patent: Oct. 17, 2006

(54) TOOL FOR CHIP-REMOVING MACHINING (75) Inventor: Kjell Englund, Valbo (SE)

(73) Assignee: Sandvik Intellectual Property AB, Sandviken (SE)

( * ) Notice: Subject to any disclaimer, the term of this patent is extended or adjusted under 35 U.S.C. 154(b) by 237 days.

(21) Appl. No.: 10/444,127

(22) Filed: May 23, 2003

(65) Prior Publication Data

US 2004/0028486 A1    Feb. 12, 2004

(30) Foreign Application Priority Data

May 28, 2002    (SE) .................................. 0201573

(51) Int. Cl.
    *B23B 27/16*    (2006.01)
(52) U.S. Cl. ...................... 407/103; 407/104; 407/105; 407/107; 407/111
(58) Field of Classification Search ................ 407/102, 407/33, 32, 40, 46, 47, 50, 91, 103, 107, 407/111, 104, 105, 109; B23B 27/16
See application file for complete search history.

(56) References Cited

U.S. PATENT DOCUMENTS

| 4,580,930 A | | 4/1986 | Zinner | |
|---|---|---|---|---|
| 4,701,084 A | * | 10/1987 | Ide | 409/131 |
| 5,139,371 A | * | 8/1992 | Kraft et al. | 407/101 |
| 5,746,549 A | * | 5/1998 | Kress et al. | 407/102 |
| 6,050,751 A | | 4/2000 | Hellström | |
| 6,234,727 B1 | * | 5/2001 | Barazani | 407/117 |
| 6,273,650 B1 | * | 8/2001 | Jordberg | 407/102 |
| 6,601,486 B1 | * | 8/2003 | Hansson et al. | 82/161 |
| 6,626,614 B1 | * | 9/2003 | Nakamura | 408/59 |
| 6,702,527 B1 | * | 3/2004 | Barazani | 407/42 |
| 2002/0002886 A1 | | 1/2002 | Hansson et al. | |

FOREIGN PATENT DOCUMENTS

| DE | 26 53 222 | | 6/1977 |
|---|---|---|---|
| DE | 198 47 227 | | 4/2000 |
| EP | 1 226 890 | | 7/2002 |
| JP | 61111801 A | * | 5/1986 |
| JP | 06190608 A | * | 7/1994 |
| JP | 09094705 A | * | 4/1997 |
| JP | 09155622 A | * | 6/1997 |
| JP | 09216103 A | * | 8/1997 |
| JP | 11245105 A | * | 9/1999 |
| JP | 2002144112 A | * | 5/2002 |

* cited by examiner

*Primary Examiner*—Monica Carter
*Assistant Examiner*—Sara Addisu
(74) *Attorney, Agent, or Firm*—Drinker Biddle & Reath LLP (57) ABSTRACT

A tool for chip-removing machining includes an insert holder, a cutting insert for chip-removing machining, and a fixing element for fixing the cutting insert in an insert seat of the insert holder. The insert has fingers projecting from a bottom side of the insert. The insert seat has a number of elastically flexible portions forming recesses therebetween which receive respective fingers of the insert. Contact surfaces of the fingers engage respective contact surfaces of the flexible portions to cause the flexible portions to flex elastically as the fingers become wedgingly secured in the recesses.

15 Claims, 5 Drawing Sheets

TOOL FOR CHIP-REMOVING MACHINING

This application claims priority under 35 U.S.C. §§119 and/or 365 to patent application Ser. No. 0201573-3 filed in Sweden on May 28, 2002, the entire content of which is hereby incorporated by reference.

TECHNICAL FIELD OF THE INVENTION

The present invention relates to a tool for chip-removing machining, the tool comprising an insert holder, a cutting insert for chip-removing machining and members to fix the cutting insert in an insert seat of the insert holder. The invention also relates to the cutting insert separately and to the insert holder separately, as well as to a method of mounting the insert in the holder.

PRIOR ART

A tool coupling is previously known from WO 01/87523 A1, which also discloses a tool for chip-removing machining of the type described above. Thereby, a cutting insert for chip-removing machining included in the tool is also previously known and an insert holder included in the tool is previously known. The cutting insert for chip-removing machining has on the bottom side thereof a male part, and the insert holder has a female part corresponding to the male part. The male part comprises a number of teeth having both axial and radial extensions. The female part comprises a number of recesses, which are designed to receive the teeth of the male part. In general, both the male part and the female part may be conical.

OBJECTS AND FEATURES OF THE INVENTION

A primary object of the present invention is to provide a tool of the kind defined above, as well as the cutting insert included in the tool and the insert holder included in the tool, whereby the fixation of the cutting insert in the insert holder should be extraordinarily stable. In this connection, it is particularly important that the cutting insert be able to withstand forces which are changeable and acting from different directions and that the fixation is not materially affected by shifting temperatures that may occur during true working conditions.

Another object of the present invention is to use such materials in the insert holder and the cutting insert that the properties of the materials are optimally utilized.

At least the primary object of the present invention is realized by a tool for chip-removing machining which comprises a chip-removing cutting insert, a holder for the insert, and a fixing element for fixing the insert to a seat of the holder. The insert includes a male part protruding from a bottom side thereof. The male part has first planar contact surfaces disposed thereon. The seat includes a plurality of elastically flexible portions and has second planar contact surfaces formed thereon. Those surfaces are arranged to be contacted by the first planar contact surfaces for flexing the flexible portions as the insert is being fixed in the seat.

The invention also pertains to the cutting insert per se which comprises a cutting body defining a center axis and having a cutting edge, a bottom side, and a male part projecting from the bottom side in the direction of the center axis. The male part includes planar contact surfaces extending generally in the direction of the axis.

The invention also pertains to the insert holder per se which comprises a body in which an insert seat is formed. The seat defines a center axis extending through the body and includes elastically flexible portions having free ends arranged to flex elastically generally in the direction of the axis. Planar contact surfaces are formed on the flexible portions and extend generally in the direction of the axis.

The invention also pertains to a method of mounting a chip-removing cutting insert in a holder comprising the steps of:

A) positioning a bottom side of the insert over the holder, wherein a protrusion extending from the bottom side faces a seat of the holder, the seat including flexible portions which are elastically flexible relative to a rigid portion of the holder in a direction of flexing; and B) clamping the insert to the holder to cause the protrusion to press against the flexible portions in the direction of flexing to elastically flex the flexible portions in the direction of flexing until the bottom side of the insert engages a rigid contact surface of the holder disposed adjacent to the flexible portions.

BRIEF DESCRIPTION OF THE DRAWINGS

Below, a number of preferred embodiments of the invention will be described with reference to the appended drawings.

DETAILED DESCRIPTION OF THE PREFERRED EMBODIMENTS OF THE INVENTION

Figure 1:
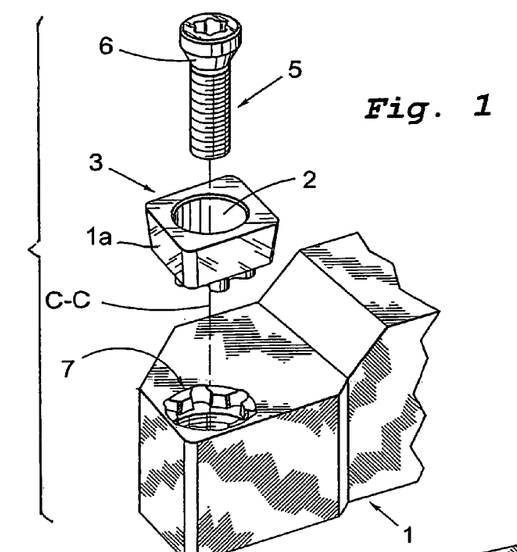
FIG. 1 shows an exploded view in perspective of a tool according to the present invention.

In FIG. 1, an exploded view of a tool according to the present invention is shown. Thus, the tool comprises an insert holder 1, a cutting insert 3 for chip-removing machining and members for fixation, in the form of a locking or fixing screw 5, in order to fix the cutting insert 3 in a insert seat 7 of the insert holder 1. The locking screw 5 has a conical head 6. A common center axis for the locking screw 5, the cutting insert 3 and the insert seat 7 is designated C—C in FIG. 1.

Figure 2:
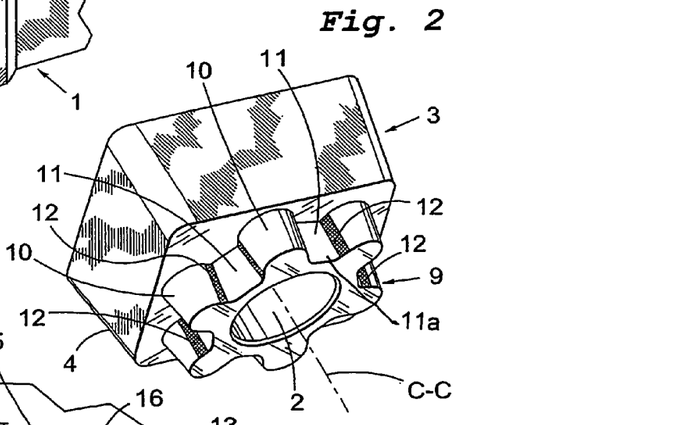
FIG. 2 shows a perspective view from below of the cutting insert for chip-removing machining included in the tool.

As may be seen in FIGS. 1 and 2, the cutting insert 3 for chip-removing machining has a cutting edge 1a and a through hole 2 for receipt of the locking screw 5. The cutting insert 2 is provided with a protrusion or male part 9 projecting from a bottom side 3a thereof, which is formed integrally with a cutting body 4 of the cutting insert 3. The male part 9 comprises a number of fingers 10 extending radially from the center of the cutting insert 3, the number of fingers 10 in the embodiment shown being six. A number of first recesses 11 are defined between the fingers 10, which also are included in the male part 9. The fingers 10 and the first recesses 11 have a certain axial extension in the longitudinal direction of the center axis C—C. First planar contact surfaces 12 are formed on the fingers 10, at the transition to an adjacent first recess 11, which surfaces 12 generally having both radial and axial extensions in relation to the center axis C—C. In the embodiment illustrated, each finger 10 of the male part 9 generally has a form tapering in the direction from the cutting body 4, and the first plane contact surfaces 12 arranged on one and the same finger 10 thus converge towards each other in the direction from the cutting body 4. Correspondingly, each first recess 11 has a generally widening form in the direction from the cutting body 4. Each recess includes a floor formed by a wall 11a which extends downwardly from the bottom side 3a in the axial direction. Each wall faces in a direction transversely of the axis C—C and interconnects adjacent fingers 10.

Figure 3:
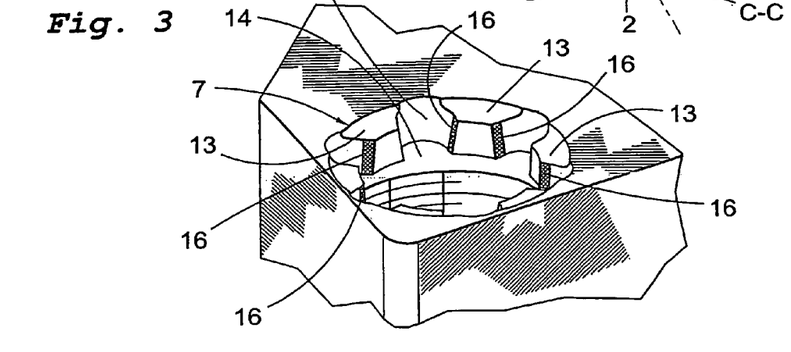
FIG. 3 shows a perspective view obliquely from above of the insert seat of the insert holder included in the tool according to the present invention.
Figure 4:
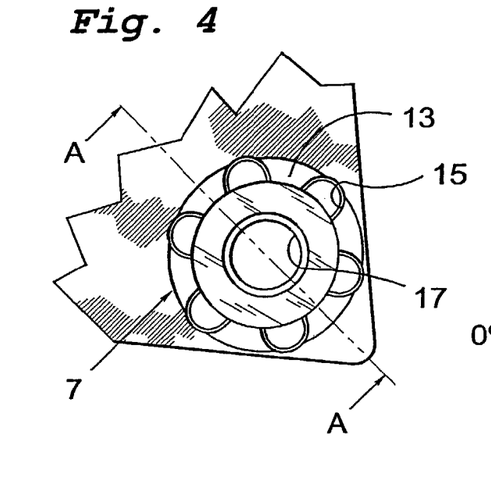
FIG. 4 shows a plan view of the insert seat according to FIG. 3.
Figure 5:
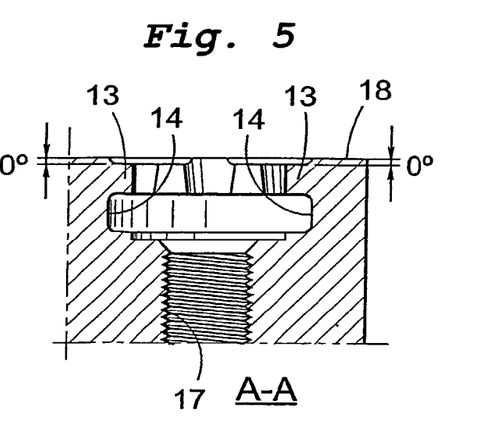
FIG. 5 shows a section along line A—A of FIG. 4.
Figure 6:
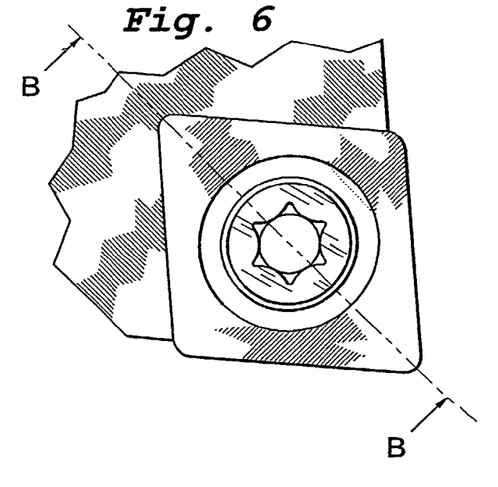
FIG. 6 shows a plan view of the part of the tool where the cutting insert is received in the insert holder.
Figure 7:
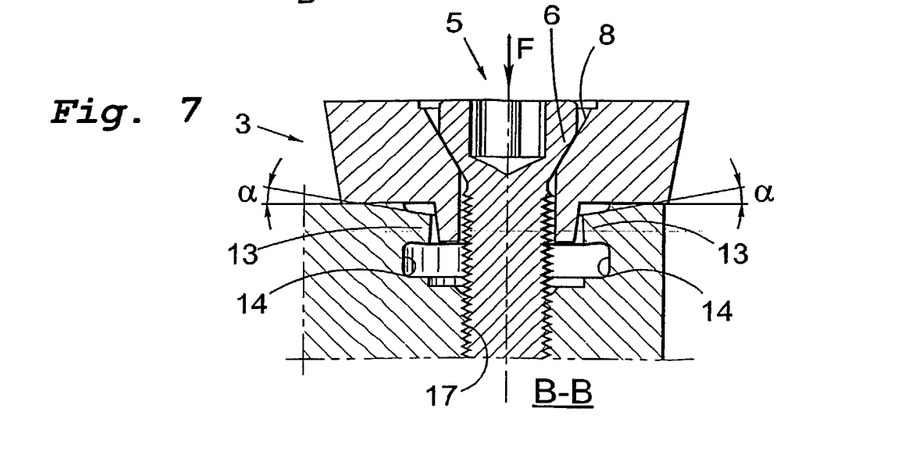
FIG. 7 shows a section along line B—B of FIG. 6.

The insert seat 7, illustrated in detail in FIG. 3, comprises a first or upper hole defining a female part adapted to receive the male part 9. Extending around a periphery of the hole are a number of elastically flexible portions 13 extending radially towards the center of the insert seat 7, which portions 13 are rendered flexible in the axial direction (with reference to the axis C—C) by an undercut or notch 14 formed in the holder at a location disposed beneath radially outer ends of the portions 13 (as best seen in FIGS. 5, 7). The flexible portions 13 amount to six. Between the flexible portions 13, a number of second recesses 15 are defined, which also amount to six. In the area of the free ends thereof, the flexible portions 13 are provided with second planar contact surfaces 16, which are arranged on sections of the flexible portions 13 that have a generally radial extension. The flexible portions 13 and the second recesses 15 have a certain axial extension in the direction of the center axis C—C, but the axial extensions of the fingers 10 and the flexible portions 13 do not need to be equal.

In general, each of the second recesses 15 has a tapering form in the direction into the insert seat 7, whereby the second plane contact surfaces 16, arranged in opposite pairs adjacent to the transition between the flexible portions 13 and the second recesses 15, converge towards each other in the direction into the insert seat 7.

The insert seat 7 also includes an internally threaded second hole 17, which is intended to receive the externally threaded portion of the locking screw 5.

On mounting of the cutting insert 3 in the insert holder 1, the male part 9 of the cutting insert 3 is caused to be received in the insert seat 7, wherein the fingers 10 of the male part 9 are received in the second recesses 15 of the insert seat 7. In that regard, the first and second contact surfaces 12 and 16 are placed in such a way that they will abut against each other when the cutting insert 3 is mounted in the insert seat 7. Now the locking screw 5 is introduced through the hole 2 of the cutting insert 3, and the externally threaded portion of the locking screw 5 is received in the internally threaded second hole 17 of the insert holder 1. On tightening of the locking screw 5, the conical head 6 of the locking screw 5 will come into abutment against a conical contact surface 8 of the cutting insert 3, see FIG. 7. On continued tightening of the locking screw 5, the cutting insert 3 will become affected by an axially directed force F, which will displace the cutting insert 3 towards the insert seat 7. By means of the downwardly tapering form of the fingers 10 and the corresponding widening form of the second recesses 15, the first and second contact surfaces 12 and 16, respectively, will come to a wedge-like mutual abutment. The mutual abutment of the contact surfaces 12 and 16 in the axial direction C—C means that the flexible portions 13 are given a corresponding displacement/deflection in the axial direction of flexing, i.e., towards the second hole 17 (see FIG. 7). This displacement of the flexible portions 13 in the direction of insertion of the cutting insert, i.e., in the direction of the axis C—C, is made possible by the notch (undercut) 14, which gives the flexible portions 13 a certain flexibility. The deflection of the flexible portions 13 is illustrated in FIG. 7, where the deflection is symbolized by the angle α that the upper surfaces of the flexible portions 13 form with a rigid (i.e., non-flexible) contact surface 18 that surrounds the seat 7 and that is situated radially outside of the second recesses 15. In reality, $0°30'<\alpha<12°$. As is seen in FIG. 7, the bottom side 3a of the cutting insert 3 will abut against the rigid contact surface 18, to terminate the flexing of the flexible portions 13. The contact between the bottom side 3a and the contact surface 18, in combination with the wedging engagement between the contact surfaces 12 and 16, guarantees an extraordinary good fixation of the cutting insert 3 in the insert holder 1 against movement in all directions.

Figures 8, 9:
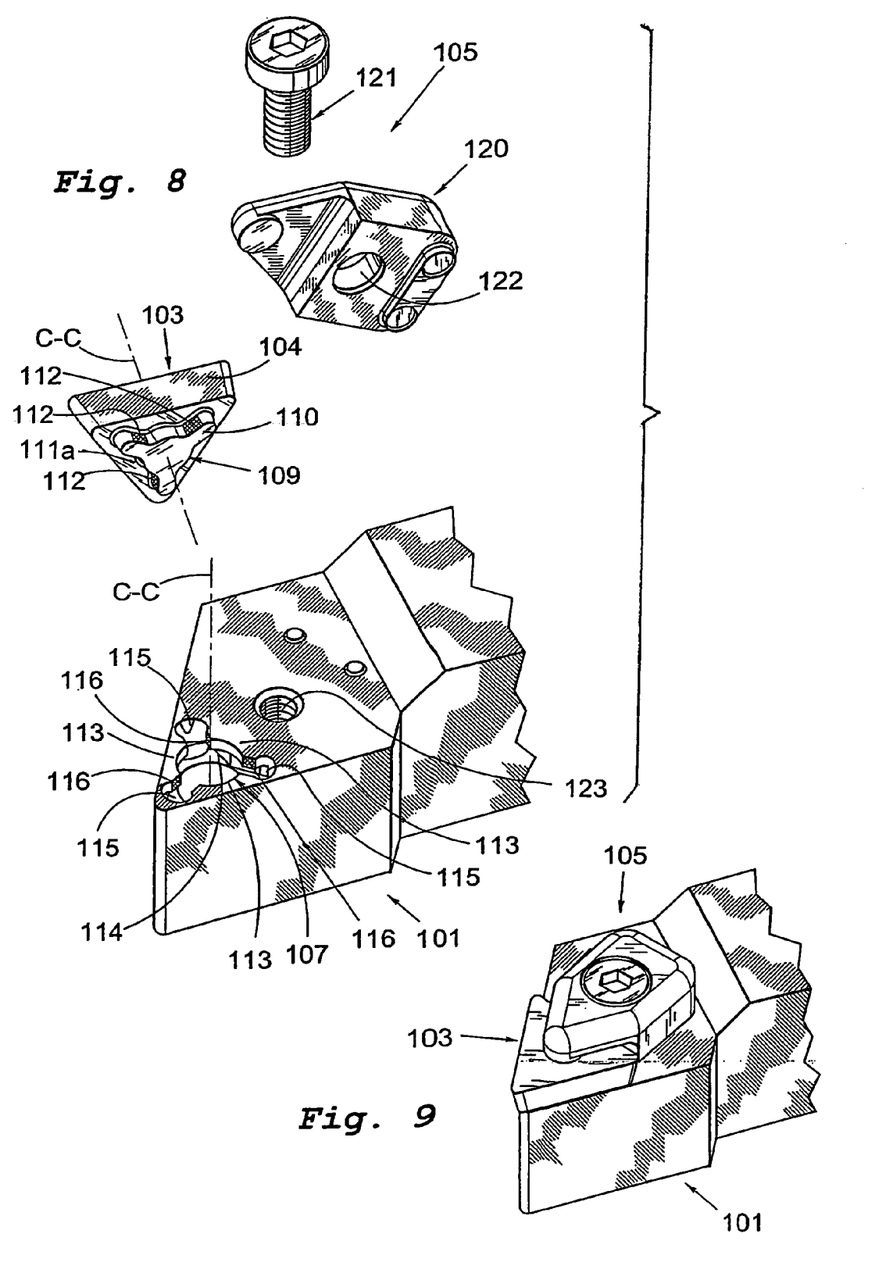
FIG. 8 shows an exploded view in perspective of a first alternative embodiment of the tool according to the present invention.
FIG. 9 shows a perspective view of the tool according to FIG. 8 when the cutting insert is mounted in the insert holder.

In a first alternative embodiment of a tool according to the present invention illustrated in FIG. 8, the tool comprises an insert holder 101, a triangular cutting insert 103 for chip-removing machining and a fixation assembly 105 to fix the cutting insert 103 in a insert seat 107 in the insert holder 101. The fixation assembly 105 in this embodiment comprises a clamp 120 and a locking screw 121, by means of which the clamp 120 is fixed in relation to the insert holder 101 by the locking screw 121 being received in a through hole 122 of the clamp 120 and in a threaded hole 123 of the insert holder 101.

As may be seen in FIG. 8, the cutting insert 103 comprises a male part 109, which projects from the bottom side of the cutting insert 103. In the embodiment illustrated, the male part 109 comprises three equi-spaced fingers 110, i.e., the adjacent fingers 110 between themselves defining equal angles. Adjacent fingers 110 are interconnected by a floor 111a of a recess disposed between adjacent fingers. Arranged on the peripheral surfaces of the fingers 110 are first planar contact surfaces 112 that generally have an extension in both radial and axial directions in relation to the central axis C—C. The fingers 110 are of a generally tapering shape in the direction from the cutting body 104. This implies that the two first plane contact surfaces 112 arranged on each finger 110 are not mutually parallel but rather converge towards each other in a direction from the cutting body 104.

The insert seat 107 comprises a number of flexible portions 113, which are defined by a notch or undercut 114 which like the notch 14 disclosed earlier, is formed at the bottom side of the portions 113, the notch being of principally the same design as the earlier-described notch 14. The flexible portions 113 amount to three. Between the flexible portions 113, a number of second recesses 115 are defined, which also amount to three. In the transition between the flexible portions 113 arid the second recesses 115, second plane contact surfaces 116 are arranged, which thus are arranged on the parts of the flexible portions 113 that generally have an extension both in the radial direction and the axial direction in relation to the center axis C—C of the insert seat 107. The second plane contact surfaces 116 are generally opposite each other in pairs, said opposite, plane second contact surfaces 116 not being parallel to each other but rather converging towards each other in a direction into the insert holder 101. The flexible portions 113 and the second recesses 115 have a certain extension in the axial direction in relation to the center axis C—C, whereby the axial extensions of the fingers 110 and the flexible portions 113 do not need to be equal.

At mounting of the cutting insert 103 in the insert seat 107, see FIG. 9, the fingers 110 are received in the second recesses 115, whereby the first plane contact surfaces 112 of the male part 109 abut against the second plane contact surfaces 116 of the insert seat 107. The reason for contact being established between said surfaces 112, 116 is that they converge in the same direction. On clamping the cutting insert 103 in the insert holder 101, this is carried out by means of the fixation assembly 105 that comprises a clamp 120 and a locking screw 121. In that connection, the cutting insert 103 with the integrated male part 109 thereof will be pushed further into the insert seat 107, whereupon the abutment pressure between the contact surfaces 112 and 116 increases. When the clamping force acting on the cutting insert 103 becomes large enough, a displacement/deflection of the flexible portions 113 will take place in a manner corresponding to that described above in connection with the embodiment according to FIGS. 1–7. In that connection, the bottom side of the cutting insert 103 will abut against the portion of the insert holder 101 that surrounds the seat 107 and an extraordinarily good fixing of the cutting insert 103 is obtained.

Figure 10:
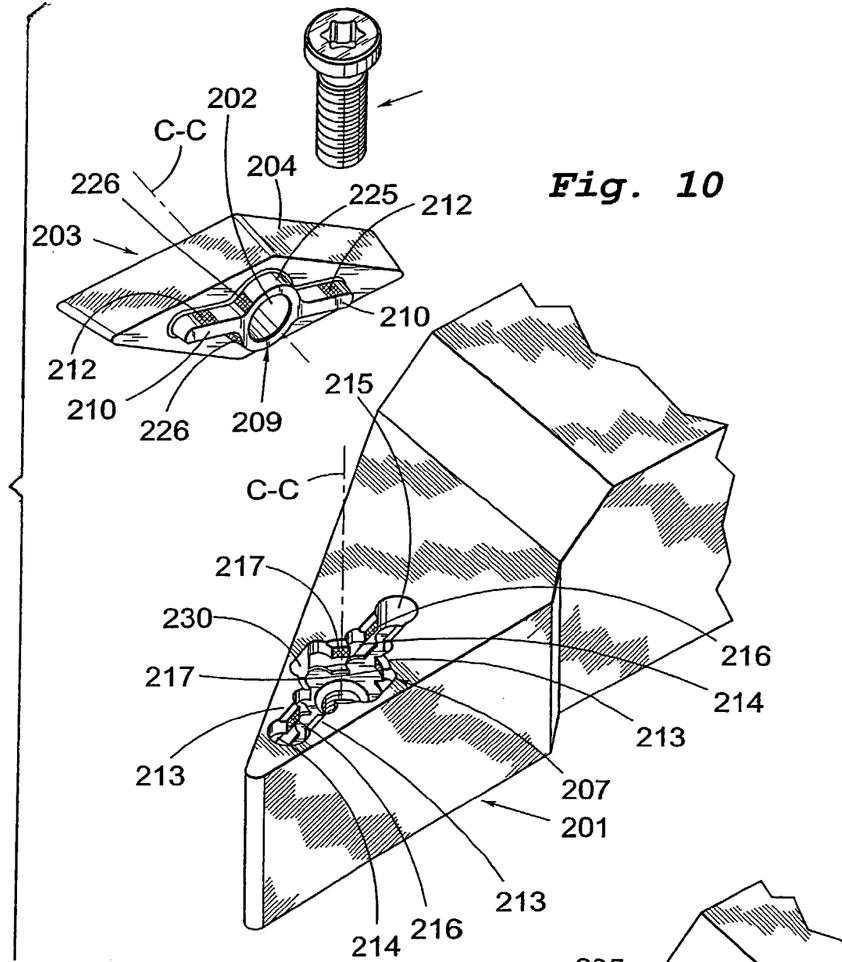
FIG. 10 shows an exploded view in perspective of a second alternative embodiment of the tool according to the present invention.
Figure 11:
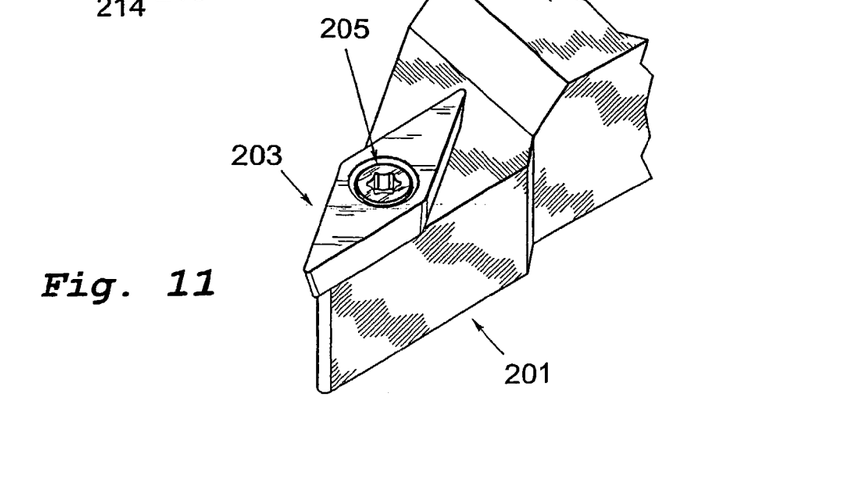
FIG. 11 shows a perspective view of the tool according to FIG. 10 when the cutting insert is mounted in the insert holder.

In the second alternative embodiment of a tool according to the present invention illustrated in FIGS. 10 and 11, it may be seen that the cutting insert 203 included in the tool at the bottom side thereof is provided with a male part 209 that comprises two diametrically arranged fingers 210 and a generally circular center portion or hub 225. In the embodiment illustrated, the fingers 210 and the center portion 225 are made integrally with the cutting body 204. The fingers 210 and the center portion 225 are mutually likewise formed in one piece. A peripheral surface of the hub 225 interconnects the fingers and defines a floor of a recess disposed between the fingers. The cutting insert 203 has a central first through hole 202. On the peripheral surfaces of the fingers 210 that generally have an extension both in the radial and axial directions in relation to the center axis C—C, first plane contact surfaces 212 are arranged. The fingers 210 are of a generally tapering shape in a direction from the cutting body 204. This means that the first plane contact surfaces 212 arranged on each finger 210 are not parallel but converge towards each other in a direction from the cutting body 204. Furthermore, in the embodiment according to FIGS. 10 and 11, third contact surfaces 226 are arranged on the peripheral surface of the center portion 225 which have an extension both in the axial and radial directions in relation to the center axis C—C. Said third contact surfaces 226 are arranged in diametrically opposite pairs in respect of the center axis C—C and the surfaces of each pair converge towards each other in a direction from the cutting body 204. The third contact surfaces 226 are not planar but assume the shape of the center portion 225, i.e. they are curved.

The insert seat 207 comprises two diametrically opposite second recesses 215, which are intended to receive the fingers 210, and two diametrically opposite third recesses 230, which are intended to receive parts of the center portion 225 of the cutting insert 203. Between the recesses 215 and 230, the insert seat 207 has a number of flexible portions 213, which are made flexible by the insert seat 207 having a number of notches or undercuts 214. The free edges of the flexible portions 213, i.e. surfaces having both transversely and axially directed extensions relative to the center axis C—C, define a number of second and fourth contact surfaces 216 and 217, respectively. The second contact surfaces 216 are plane and generally opposite each other in pairs in the second recesses 215, wherein said opposite, plane second contact surfaces 216 are not parallel to each other but rather converge towards each other in a direction into the insert holder 201. The fourth contact surfaces 217 are arranged in the central area of the insert seat 207. Said fourth contact surfaces 217 are not plane but have a curved shape adapted to the curved third contact surfaces 226 as they are intended to interact with said contact surfaces 226.

On mounting the cutting insert 203 in the insert seat 207, see FIG. 11, the fingers 210 are received in the second recesses 215, and parts of the center portion 225 are received in the third recesses 230. The first plane contact surfaces 212 and the third contact surfaces 226 of the male part 209 will thereby abut against the second plane contact surfaces 216 and the fourth contact surfaces 217, respectively, of the insert seat 207. Principally, interaction between said contact surfaces takes place in the corresponding manner as in the case of the above-described embodiments. As a consequence of this interaction, a displacement/deflection of the flexible portions 213 will take place in a manner corresponding to that described for the embodiments according to FIGS. 1–9. In that connection, the bottom side of the cutting insert 203 will abut against the contact surface of the insert holder 201 surrounding the seat 207, and an extraordinary good fixing of the cutting insert 203 is obtained.

Figure 12:
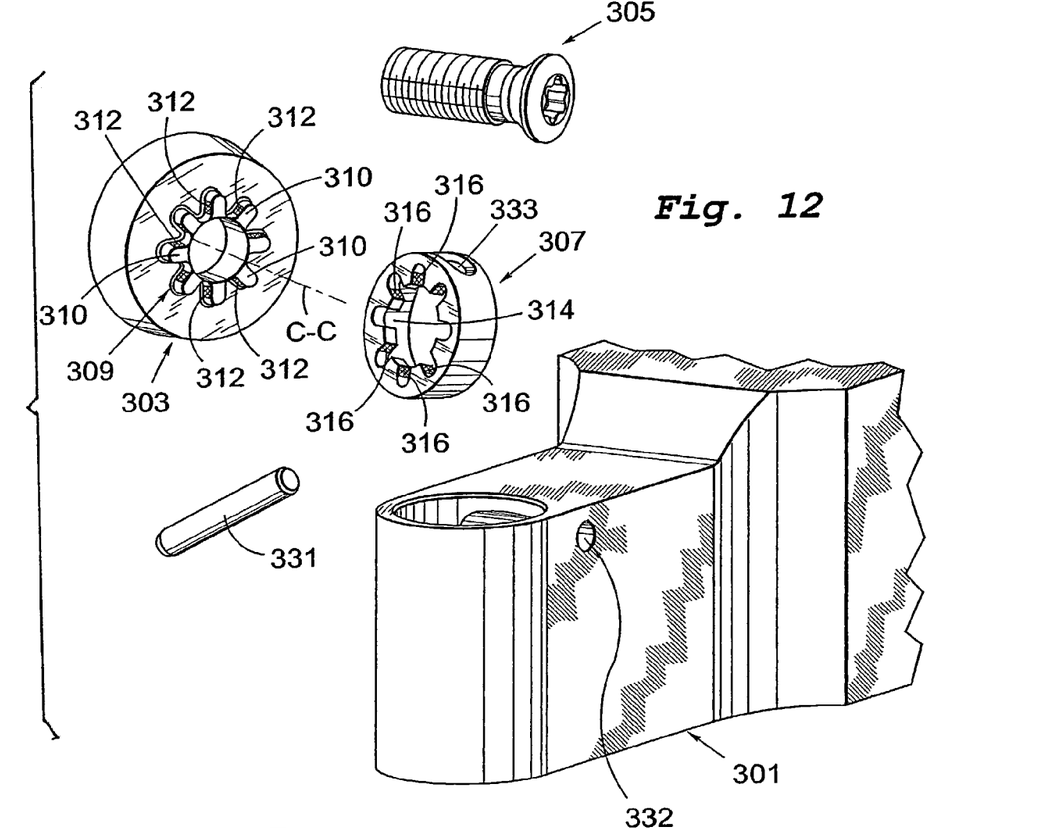
FIG. 12 shows an exploded view in perspective of a third alternative embodiment of the tool according to the present invention.
Figure 13:
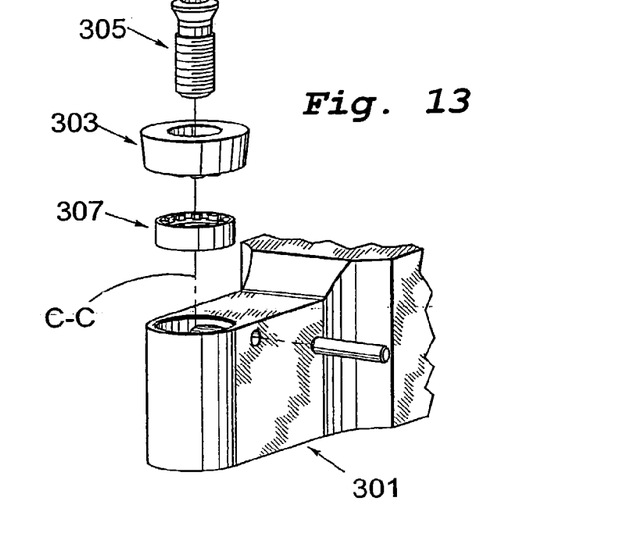
FIG. 13 also shows an exploded view in perspective of the tool according to FIG. 12, the parts included in the tool being oriented in mounting position.

In the third alternative embodiment of the tool according to the present invention illustrated in FIG. 12, the insert seat 307 has the form of a replaceable unit, which has a generally cylindrical external surface. The replaceable unit 307 may be mounted in and dismounted from the insert holder 301. In the embodiment according to FIG. 12, this is accomplished by means of a locking pin 331, which is introduced into in a fifth hole 332 of the insert holder 301, the locking pin 331 interacting with a groove 333 in the periphery of the replaceable unit 307. In FIG. 13 it is shown how the replaceable unit 307 and the locking pin 331 are oriented in connection with the replaceable unit 307. The male part 309 of the cutting insert 303 principally has a design corresponding to the male part 9 of the cutting insert 3, however, the male part 309 comprises more fingers 310. Adjacent fingers are interconnected by a wall which forms a floor of a recess disposed between the adjacent fingers. As for the insert seat/the replaceable unit 307, this is of a design that in principle corresponds to the insert seat 7 of the insert holder 1, however, the replaceable unit 307 comprises more flexible portions 313. As for the function of the tool according to FIGS. 12 and 13, it principally corresponds with the function of the tool according to FIGS. 1–7, and therefore reference is made to relevant sections of the above text in the description.

FEASIBLE MODIFICATIONS OF THE INVENTION

According to a preferred embodiment, the male part 9; 109; 209; 309 of the cutting inserts 3; 103; 203; 303 included in the above-described tools is made from the same material as the cutting inserts, i.e. usually cemented carbide. This is appropriate as the male part 9; 109; 209; 309 in principle is exerted to compressive strains only. However, within the scope of the present invention it may also be conceived that the male part 9; 109; 209; 309 is made from a different material than the cutting body 4; 104; 204; 304, whereby the male part 9; 109; 209; 309 and the cutting body 4; 104; 204; 304 would be mutually interconnected by suitable means.

Generally, for all above described embodiments, the axial extension of the male part 9; 109; 209; 309 does not need to correspond with the axial extension of the flexible portions 13; 113; 213; 313.

As for the shape of the fingers 10; 110; 210; 310 of the male part and the shape of the second recesses 15; 115; 215 9; 109; 209; 309, these do not need to be mutually complementary. It is sufficient if the first plane contact surfaces 12; 112; 212; 312 and the second plane contact surfaces 16; 116; 216; 316 are mutually oriented in such a way that abutment between these surfaces is established when the cutting insert 3; 103; 203; 303 is mounted in the insert scat 7; 107; 207; 307.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

The invention claimed is:

1. A tool for chip-removing machining comprising a chip-removing cutting insert, a holder for the insert, and a fixing element for fixing the insert to a seat of the holder, wherein:
    the insert defines a center axis and includes a male part protruding in the direction of the axis from a bottom side thereof, the male part having first contact surfaces disposed thereon; and
    the seat including a plurality of elastically flexible portions and having second contact surfaces formed thereon and arranged to be contacted by respective first contact surfaces as the insert is pressed onto the seat in an axial direction of insertion for flexing the flexible portions in the axial direction as the insert is being fixed in the seat;
    wherein the male part comprises fingers on which the first contact surfaces are formed, each finger including two of the first contact surfaces arranged to converge in a direction away from the bottom side of the insert.

2. The tool according to claim 1 wherein the holder includes a rigid surface disposed adjacent the flexible portions and arranged to be contacted by the bottom side of the insert to terminate the flexing of the flexible portions.

3. The tool according to claim 1 wherein the second contact surfaces are arranged in pairs that converge in a direction in which the insert is fixed onto the holder, for wedgingly receiving the fingers therebetween.

4. The tool according to claim 1 wherein the holder includes an undercut for rendering the flexible portions elastically flexible.

5. The tool according to claim 1 wherein the first and second planar contact surfaces generally extend in the direction of the axis.

6. The tool according to claim 1 wherein the insert is replaceably mounted in the holder.

7. The tool according to claim 1 wherein the male part comprises a plurality of fingers receivable in respective recesses of the seat, the second contact surfaces forming portions of sides of the recesses, the fingers being wedged into the recesses as the insert is fixed to the holder.

8. The tool according to claim 7 wherein the holder includes a rigid contact surface adjacent the flexible portions for being engaged by the bottom side of the insert to terminate the flexing of the flexible portions.

9. A tool for chip-removing machining comprising a chip-removing cutting insert, a holder for the insert, and a fixing element for fixing the insert to a seat of the holder, wherein:
    the insert defines a center axis and includes a male part protruding in the direction of the axis from a bottom side thereof, the male part having first contact surfaces disposed thereon; and
    the seat including a plurality of elastically flexible portions and having second contact surfaces formed thereon and arranged to be contacted by respective first contact surfaces as the insert is pressed onto the seat in an axial direction of insertion for flexing the flexible portions in the axial direction as the insert is being fixed in the seat, wherein the second contact surfaces are arranged in pairs that converge in a direction in which the insert is fixed onto the holder in the direction of the axis, for wedgingly receiving the fingers therebetween.

10. A tool for chip-removing machining comprising a chip-removing cutting insert, a holder for the insert, and a fixing element for fixing the insert to a seat of the holder, wherein:
    the insert defines a center axis and includes a male part protruding in the direction of the axis from a bottom side thereof, the male part having first contact surfaces disposed thereon; and
    the seat including a plurality of elastically flexible portions and having second contact surfaces formed thereon and arranged to be contacted by respective first contact surfaces as the insert is pressed onto the seat in an axial direction of insertion for flexing the flexible portions in the axial direction as the insert is being fixed in the seat, wherein the fixing element comprises a screw passing through the insert and the seat and threadedly secured in the holder.

11. A tool for chip-removing machining comprising a chip-removing cutting insert, a holder for the insert, and a fixing element for fixing the insert to a seat of the holder, wherein:
    the insert defines a center axis and includes a male part protruding in the direction of the axis from a bottom side thereof, the male part having first contact surfaces disposed thereon; and
    the seat including a plurality of elastically flexible portions and having second contact surfaces formed thereon and arranged to be contacted by respective first contact surfaces as the insert is pressed onto the seat in an axial direction of insertion for flexing the flexible portions in the axial direction as the insert is being fixed in the seat, wherein the fixing element comprises a clamp threadedly secured at one end thereof to the holder and engaging the insert at another end thereof.

12. An insert holder comprising a body in which an insert seat is formed, the seat defining a center axis extending through the body and including elastically flexible portions having free ends arranged to flex elastically substantially in the direction of the axis, contact surfaces formed on the flexible portions and extending generally in the direction of the axis, wherein the seat comprises a hole formed in a rigid surface of the body and extending along the axis, the flexible portions extending inwardly from a wall of the hole.

13. The insert holder according to claim 12 further including recesses disposed between adjacent flexible portions, there being a pair of the contact surfaces facing one another on opposite sides of each recess and being convergent in a direction away from the rigid surface.

14. A method of mounting a chip-removing cutting insert in a holder, the insert defining a center axis, the method comprising the steps of:
  A) positioning a bottom side of the insert over the holder, wherein a protrusion extending axially from the bottom side faces a seat of the holder, the seat including flexible portions elastically flexible relative to a rigid portion of the holder in a direction of the axis; and
  B) clamping the insert to the holder to cause the protrusion to press against the flexible portions in the direction of the axis to elastically flex the flexible portions in the direction of the axis until the bottom side of the insert engages the rigid contact portion of the holder, wherein the flexible portions extend inwardly from a side of a hole formed in the rigid portion of the holder, the protrusion comprises fingers arranged to enter recesses disposed between the flexible portions, the recesses and the fingers tapering in the direction of flexing, wherein the fingers enter the respective recesses during step B to become wedged between the flexible portions.

15. An insert holder comprising a body in which an insert seat is formed, the seat defining a center axis extending through the body and including elastically flexible portions having free ends arranged to flex elastically substantially in the direction of the axis, contact surfaces formed on the flexible portions and extending generally in the direction of the axis, wherein the body includes a threaded hole formed therein along the axis for receiving a fastening screw.

* * * * *